(12) United States Patent
Liu

(10) Patent No.: US 12,462,830 B2
(45) Date of Patent: Nov. 4, 2025

(54) AUDIO PLAYBACK METHOD, ELECTRONIC DEVICE, AND COMPUTER-READABLE STORAGE MEDIUM

(71) Applicant: MediaTek Singapore Pte. Ltd., Singapore (SG)

(72) Inventor: Yuyun Liu, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 233 days.

(21) Appl. No.: 18/361,136

(22) Filed: Jul. 28, 2023

(65) Prior Publication Data

US 2024/0153522 A1   May 9, 2024

(30) Foreign Application Priority Data

Nov. 8, 2022 (CN) .......................... 202211394447.2

(51) Int. Cl.
   *G06F 1/12*   (2006.01)
   *G10L 21/043*   (2013.01)
(52) U.S. Cl.
   CPC ................................. *G10L 21/043* (2013.01)
(58) Field of Classification Search
   CPC . G06F 1/12; G06F 16/60; G06F 17/30; G06F 14/3074; H04L 65/601; H04L 67/02; H04L 65/80; H04N 21/4325; H04N 21/4307; H04N 21/8113; H04N 21/43072; G10L 21/043
   See application file for complete search history.

(56) References Cited

U.S. PATENT DOCUMENTS 6,130,987 A * 10/2000 Tanaka ............. G11B 20/00007
                                                              386/254
9,666,197 B2   5/2017 Sinai
9,866,964 B1 * 1/2018 Haskin ................... H04R 27/00
(Continued)

FOREIGN PATENT DOCUMENTS

CN   103294441 A   9/2013
TW   202236084 A   9/2022

OTHER PUBLICATIONS

Chinese language office action dated Sep. 26, 2023, issued in application No. TW 112101510.

*Primary Examiner* — Jakieda R Jackson
(74) *Attorney, Agent, or Firm* — McClure, Qualey & Rodack, LLP

(57) ABSTRACT

An audio playback method includes: calculating an estimated playback delay difference of a current audio data, wherein the estimated playback delay difference is a difference value between a set playback delay and an estimated playback delay of the current audio data on a playback device; in response to the estimated playback delay difference being between a first lower limit value and a first upper limit value, adjusting a playback rate of audio on the playback device based on the estimated playback delay difference; in response to the estimated playback delay difference being greater than the first upper limit value or less than the first lower limit value, deleting audio data from or adding audio data to an audio buffer based on the estimated playback delay difference; and adding the current audio data to the audio buffer to play audio data that is in the audio buffer.

16 Claims, 6 Drawing Sheets

(56) References Cited

U.S. PATENT DOCUMENTS

| | | | |
|---|---|---|---|
| 10,484,447 B2* | 11/2019 | Asveren | H04L 65/764 |
| 10,650,840 B1* | 5/2020 | Solbach | G10L 21/0224 |
| 10,741,221 B2* | 8/2020 | Kwan | H04N 21/47217 |
| 11,259,069 B1* | 2/2022 | Hsieh | H04N 21/414 |
| 11,580,954 B2 | 2/2023 | Olivieri et al. | |
| 2008/0025347 A1* | 1/2008 | Mantegna | H04M 3/2236 |
| | | | 704/E19.041 |
| 2008/0085098 A1* | 4/2008 | Ullmann | H04N 21/42222 |
| | | | 386/E5.052 |
| 2013/0268980 A1* | 10/2013 | Russell | H04N 21/6332 |
| | | | 725/75 |
| 2014/0237112 A1* | 8/2014 | Chen | H04L 65/65 |
| | | | 709/224 |
| 2014/0358264 A1 | 12/2014 | Long et al. | |
| 2015/0046953 A1* | 2/2015 | Davidson | H04N 21/44008 |
| | | | 725/74 |
| 2015/0081068 A1* | 3/2015 | Cheng | H04N 21/436 |
| | | | 700/94 |
| 2015/0363411 A1* | 12/2015 | Du | G06F 16/60 |
| | | | 700/94 |
| 2016/0014513 A1* | 1/2016 | McCoy | H04R 3/12 |
| | | | 381/79 |
| 2017/0181113 A1* | 6/2017 | Keyser-Allen | H04N 21/43076 |
| 2018/0213014 A1* | 7/2018 | Kim | H04L 65/764 |
| 2020/0007621 A1* | 1/2020 | Adams | H04L 65/612 |
| 2020/0065059 A1* | 2/2020 | Shih | G06F 3/165 |
| 2021/0255824 A1 | 8/2021 | Millington | |
| 2021/0405962 A1 | 12/2021 | Mackay et al. | |
| 2022/0256215 A1* | 8/2022 | Begen | H04N 21/64753 |

* cited by examiner

AUDIO PLAYBACK METHOD, ELECTRONIC DEVICE, AND COMPUTER-READABLE STORAGE MEDIUM

CROSS REFERENCE TO RELATED APPLICATIONS

This application claims priority of China Patent Application No. 202211394447.2, filed on Nov. 8, 2022, the entirety of which is incorporated by reference herein.

BACKGROUND OF THE INVENTION

Field of the Invention

The present application relates to the technical field of audio playback, and more particularly, to an audio playback method and device.

Description of the Related Art

With the development of multimedia technology, in more and more application scenarios, there is need for a synchronous playback system composed of multiple devices that can perform synchronous audio playback. This means that the aforementioned system would synchronously play sound from multiple devices, thereby achieving a function and effect that is difficult to achieve using only a single device. However, the effect of synchronous playback provided by the existing audio playback methods is relatively poor.

BRIEF SUMMARY OF THE INVENTION

The present application provides an audio playback method and device, which can improve the effect of synchronous playback for audio.

In order to achieve the above objective, the present application provides an audio playback method comprising the following steps:
- calculating an estimated playback delay difference of a current audio data, wherein the estimated playback delay difference is a difference value between a set playback delay of the current audio data and an estimated playback delay of the current audio data on a playback device or an opposite number of the difference value;
- in response to the estimated playback delay difference being between a first lower limit value and a first upper limit value, adjusting a playback rate of audio on the playback device based on the estimated playback delay difference;
- in response to the estimated playback delay difference being greater than the first upper limit value or less than the first lower limit value, deleting audio data from or adding audio data to an audio buffer of the playback device based on the estimated playback delay difference; and
- adding the current audio data to the audio buffer, so as to play audio data that is in the audio buffer.

In an embodiment, after the estimated playback delay difference of the current audio data is calculated, the audio playback method further comprises:
- confirming whether the current audio data is previous preset frame audio;
- in response to the current audio data being the previous preset frame audio, adjusting the playback rate of audio on the playback device based on the estimated playback delay difference in response to the estimated playback delay difference being between a first lower limit value and a first upper limit value, or deleting audio data from or adding audio data to the audio buffer of the playback device based on the estimated playback delay difference in response to the estimated playback delay difference being greater than the first upper limit value or less than the first lower limit value; and
- in response to the current audio data not belonging to the previous preset frame audio, deleting audio data from or adding audio data to the audio buffer of the playback device based on the estimated playback delay difference in response to the estimated playback delay difference being greater than a third upper limit value or less than a third lower limit value.

In an embodiment, the step of adjusting the playback rate of audio on the playback device based on the estimated playback delay difference in response to the estimated playback delay difference being between the first lower limit value and the first upper limit value comprises:
- in response to the estimated playback delay difference being between the first lower limit value and a second lower limit value or between a second upper limit value and the first upper limit value, adjusting the playback rate of audio on the playback device based on the estimated playback delay difference; and
- in response to the estimated playback delay difference being between the second lower limit value and the second upper limit value, performing no processing on the playback rate.

In an embodiment, the step of adjusting the playback rate of audio on the playback device based on the estimated playback delay difference comprises:
- adjusting the playback rate of audio on the playback device by adjusting a clock frequency of the playback device.

In an embodiment, the estimated playback delay difference is equal to the difference value. The step of deleting audio data from or adding audio data to the audio buffer of the playback device based on the estimated playback delay difference in response to the estimated playback delay difference being greater than the first upper limit value or less than the first lower limit value comprises:
- in response to the estimated playback delay difference being greater than the first upper limit value, adding audio data to the audio buffer of the playback device based on the estimated playback delay difference; and
- in response the estimated playback delay difference being less than the first lower limit value, deleting audio data from the audio buffer of the playback device based on the estimated playback delay difference.

In an embodiment, the audio playback method further comprises:
- in response to the estimated playback delay difference being greater than the first upper limit, causing a playback duration corresponding to the amount of added audio data to be equal to a sum of the estimated playback delay difference and ½ of the first upper limit value; and
- in response to the estimated playback delay difference being less than the first lower limit value, causing a playback duration corresponding to the amount of deleted audio data to be equal to a sum of the estimated playback delay difference and ½ of the first lower limit value.

In an embodiment, before the estimated playback delay difference of the current audio data is calculated, the audio playback method further comprises:

transmitting preset audio data to the audio buffer to activate playback components in the playback device in advance; and in response to acquiring audio data to be played, stopping the transmission of the preset audio data to the audio buffer and taking the audio data to be played as the current audio data.

In an embodiment, the step of calculating the estimated playback delay difference of the current audio data comprises:

taking a value that is obtained by subtracting a playback duration corresponding to the amount of audio data in the audio buffer and a current time from the set playback delay of the current audio data as the estimated playback delay difference.

In order to achieve the above object, the present application also provides an electronic device, wherein the electronic device comprises a processor, and the processor executes instructions to perform the audio playback method.

In order to achieve the above object, the present application also provides a computer-readable storage medium, wherein the computer-readable storage medium stores instructions/program data, and the instruction/program data are executed to perform the audio playback method.

After the playback device acquires the current audio data, the playback device can calculate the estimated playback delay difference of the current audio data to adjust an audio playback rate or add to or delete audio from the audio buffer based on an estimated playback delay difference of the current audio data, so that an actual playback delay of the current audio data is closer to a set playback delay than an estimated playback delay. Accordingly, the difference between the actual playback delay of the current audio data and the set playback delay of the current audio data can be reduced, thereby achieving that the playback device can play audio data with the set playback delay. Thus, when there are multiple playback devices playing audio data, the effect of synchronous audio playback of the multiple playback devices can be improved. When the estimated playback delay difference is between the first lower limit value and the first upper limit value, the playback rate of audio on the playback device is adjusted based on the estimated playback delay difference. When the estimated playback delay difference is greater than the first upper limit value or less than the first lower limit value, audio data is deleted from or added to the audio buffer based on the estimated playback delay difference. Accordingly, the playback device can play the current audio data approximately with the set playback delay through adjusting the playback rate when the absolute value of the estimated playback delay difference is relatively small, but there is no need to add audio data to or delete audio data from the audio buffer, such that synchronous audio playback can be achieved while the audio playback effect is ensured. When the absolute value of the estimated playback delay difference is relatively large, the purpose of playing the audio data approximately with the set playback delay by the playback device can be achieved as soon as possible through adding audio data to or deleting audio data from the audio buffer. That is, the audio synchronous playback can be realized as soon as possible, thereby reducing the time when multiple playback devices play audio asynchronously. Accordingly, the efficiency of audio synchronous playback is improved by providing different adjustment scales for different levels of the estimated playback delay difference.

A detailed description is given in the following embodiments with reference to the accompanying drawings.

BRIEF DESCRIPTION OF THE DRAWINGS

The accompanying drawings described here are used to provide a further understanding of the application and constitute a part of the present application. The schematic embodiments of the present application and the related descriptions are used to explain the present application and do not cause improper limitations to the present application, wherein.

DETAILED DESCRIPTION OF THE INVENTION

In the following description, in conjunction with the accompanying drawings in the embodiments of the application, the technical solutions in the embodiments of the application are clearly and completely described. Obviously, the described embodiments are only a part of the embodiments of the application, not all embodiments. Based on the embodiments in the present application, all other embodiments obtained by those of ordinary skill in the art without creative efforts fall within the scope of the claims of the present application. In addition, the term "or" indicates a non-exclusive "or" (i.e., "and/or") unless otherwise indicated (for example, "or in addition" or "or in an alternative embodiment"). Also, the various embodiments described herein are not necessarily mutually exclusive, as some embodiments can be combined with one or more other embodiments to obtain new embodiments.

Figure 1:
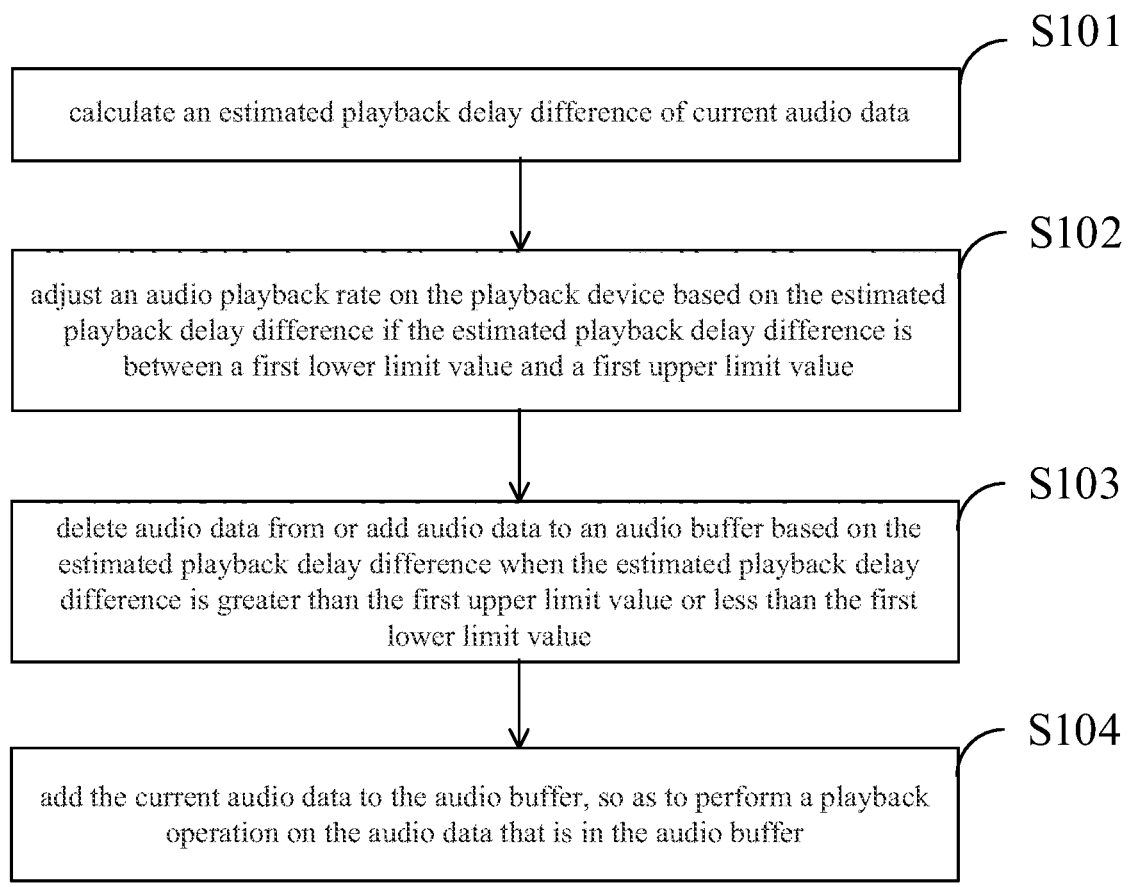
FIG. 1 is a flow chart of an audio playback method according to one embodiment of the present application.

As shown in FIG. 1, an audio playback method in an embodiment comprises the following steps. The audio playback method may be applied to a playback device. In an embodiment, the playback device may be a tablet computer, a smart home device, a mobile terminal, a Bluetooth speaker, etc., however, the present application is not limited thereto. It should be noted that the numbers of the following steps are for simplified description only, which is not intended to limit the performing order of the steps. The order in which the steps are performed in the embodiment can be changed arbitrarily without violating the technical idea of the present application.

S101: calculating an estimated playback delay difference of current audio data.

After the playback device acquires the current audio data, the playback device can calculate the estimated playback delay difference of the current audio data, so as to adjust an audio playback rate or add to or delete audio from the audio buffer based on an estimated playback delay difference of the current audio data, so that an actual playback delay of the current audio data is closer to a set playback delay than it is to an estimated playback delay. Accordingly, the difference between the actual playback delay of the current audio data and the set playback delay of the current audio data can be reduced, thereby the playback device can play audio data with the set playback delay. Thus, when there are multiple playback devices playing audio data, the effect of synchronous audio playback of the multiple playback devices can be improved.

In an embodiment, the estimated playback delay difference may be equal to the difference value between the estimated playback delay of the current audio data on the playback device and the set playback delay of the current audio data or the opposite number of the difference value.

In an implementation, each audio data may be provided with a set playback time. In Step S101, the estimated playing delay difference is calculated according to the set playback time of the current audio data, the amount of audio data in the audio buffer, and the current time, so that the audio can be played in different playback devices at a correct and relatively uniform time based on the preset playback time of the audio data. In an exemplary embodiment, the estimated playback delay difference of the current audio data on the playback device may be equal to the difference value between the set playback delay of the current audio data and the estimated playback delay of the current audio data on the playback device. In an embodiment, the set playback delay of the current audio data on the playback device may be equal to the difference value between the set playback time of the current audio data and the current time, and the estimated playback delay of the current audio data on the playback device may be equal to the playback time corresponding to the amount of audio data that has been buffered in the audio buffer. Accordingly, the estimated playback delay difference of the current audio data on the playback device can be equal to the value that is obtained by subtracting the playback time corresponding to the amount of audio data in the audio buffer and the current time from the set playback delay of the current audio data.

In an embodiment, the amount of audio data that is in the audio buffer can be obtained by calling an interface of the playback device.

In an embodiment, the set playback time can be determined by an audio collecting device or the playback device itself. In an exemplary embodiment, after the audio collection device acquires audio data, it may package the audio data and insert the set playback time of the audio data into the audio data to be packaged to obtain the packaged audio data. Then, the packaged audio data is transmitted to each playback device so that the playback device plays the audio data based on the set playback time of the audio data.

Figure 2:
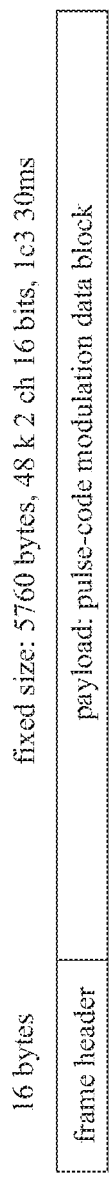
FIG. 2 is a structural schematic diagram showing audio data in an audio playback method of the present application.

Specifically, the format of the packaged audio data may comprise a frame header and a valid payload as shown in FIG. 2. In an embodiment, the format of the frame header of the audio data is be shown, for example, in Table 1, comprising sync_word of 2 Bs (bytes), version of 2 Bs, size of 4 Bs, and pts of 8 Bs. In an embodiment, the size may refer to the size of the audio data provided in the unit of bytes, excluding the header. "pts" may indicate the presentation time stamp (in nanoseconds) of the audio data. In an embodiment, "pts" may comprise BT SDU TS and MAP (System_ts, bt_ts), that is, "pts" may comprise a time base of the audio collection device and the set playback time of the audio data under the time base of the audio collection device. Thus, each playback device can determine the set playback time of the audio data under the time base of the playback device based on the time based of the audio collection device, the time base of the playback device, and the set playback time of the audio data under the time base of the audio collection device.

TABLE 1

| Frame header of audio data | | | |
|---|---|---|---|
| 0x55 | 0x55 | 0x00 | 0x01 |
| Size [3] | Size [2] | Size[1] | Size [0] |
| pts[7] | pts[6] | pts[5] | pts[4] |
| pts[3] | pts[2] | pts[1] | pts[0] |

In another embodiment, the audio playback method can be used in the audio synchronous playback of multiple playback devices. The estimated playback delay of current audio data in the playback device can be used as the set playback delay of the current audio data. In this way, another playback device can determine its estimated playback delay difference according to the set playback delay determined based on the playback device. Specifically, the estimated playback delay of the current audio data on a playback device A is used as the set playback delay of the current audio data, and a playback device B obtains the set playback delay of the current audio data from the playback device A. Then, the playback device B calculates the difference value between the set playback delay of the current audio data and the estimated playback delay of the current audio data on the playback device B to obtain the estimated playback delay difference of the current audio data.

In an embodiment, Step S101 may be performed after the current audio data is decoded to obtain the decoded current audio data, so as to avoid the time for decoding from interfering with the calculation of the estimated playback delay difference.

Further, the steps of the embodiment may be performed sequentially after the current audio data is decoded to obtain the decoded current audio data and after the decoded current audio data is processed by a pulse-coded modulation into PCM data. In Step S104, the PCM data corresponding to the current audio data is added to the audio buffer, so as to prevent the time for the pulse code modulation time from interfering with the calculation of the estimated playback delay difference and further to reduce the difference between the actual playback delay of the current audio data and the set playback delay of the current audio data.

S102: when the estimated playback delay difference is between a first lower limit value and a first upper limit value, adjusting the audio playback rate on the playback device based on the estimated playback delay difference.

After the estimated playback delay difference of the current audio data is calculated, when the estimated playback delay difference is between the first lower limit value and the first upper limit value, the audio playback rate on the playback device can be adjusted based on the estimated playback delay difference, which cases the actual playback delay of the current audio data closer to the set playback delay than the estimated playback delay, thereby achieving that the playback device plays the current audio data approximately with the set playback delay.

In an embodiment, the first lower limit value and the first upper limit value can be determined according to the actual requirements, and the present application is not limited thereto. In an example, the first lower limit value and the first upper limit value are −500 us and 500 us respectively. In another embodiment, the first lower limit value and the first upper limit value are −300 us and 300 us respectively. In further an example, the first lower limit value and the first upper limit value are −400 ns and 600 ns respectively.

In an embodiment, adjusting the audio playback rate on the playback device based on the estimated playback delay difference can be understood as the following cases. In a case where the estimated playback delay difference indicates that when the set playback delay of the current audio data is greater than the estimated playback delay of the current audio data on the playback device, the audio playback rate on the playback device can be decreased. That is, the playback time corresponding to the amount of audio data in the audio buffer becomes longer so that the actual playback delay of the current audio data is closer to the set playback delay than the estimated playback delay. In a case where the estimated playback delay difference indicates that the set playback delay of the current audio data is less than the estimated playback delay of the current audio data on the playback device, the audio playback rate on the playback device can be increased. That is, the playback time corresponding to the amount of audio data in the audio buffer becomes shorter, so that the actual playback delay of the current audio data is closer to the set playback delay than the estimated playback delay.

Decreasing the audio playback rate on the playback device may indicate subtracting a first preset value from the audio playback rate on the playback device, and increasing the audio playback rate on the playback device may indicate increasing the audio playback rate on the playback device by a second preset value. In an embodiment, the first preset value and the second preset value may be constants, and the constants may be set according to actual requirements, and the present application is not limited thereto. For example, the first preset value and the second preset value may be 0.1 or 1. In other embodiments, the first preset value and/or the second preset value may be calculated based on the estimated playback delay difference. For example, the first preset value and/or the second preset value may be directly proportional to the estimated playback delay difference. In addition, the first preset value and the second preset value may be equal or unequal.

In an embodiment, the audio playback rate on the playback device can be decreased or increased by adjusting the clock frequency (APLL) or adjusting the audio sampling rate.

In addition, Step S102 may comprises: when the estimated playback delay difference is between the first lower limit value and a second lower limit value, or between a second upper limit value and the first upper limit value, the audio playback rate on the playback device is adjusted based on the estimated playback delay difference; and if the estimated playback delay difference is between the second lower limit value and the second upper limit value, the playback rate will not be processed, that is, when the estimated playback delay difference is within an acceptable range, the audio playback rate is not processed. In an embodiment, the second lower limit value is greater than the first lower limit value, and the second upper limit value is less than the first upper limit value. The second upper limit value and the second lower limit value can be set according to actual requirements, however, they are not limited here. For example, the second upper limit value may be 50 ns, and the second lower limit value may be −50 ns. For another example, the second upper limit value may be 80 ns, and the second lower value limit may be −80 ns. For another example, the second upper limit value may be 80 ns, and the second lower value limit may be −50 ns.

It can be understood that when the difference between the actual playback delay of the current audio data and the set playback delay is within an acceptable range by adjusting the playback rate, the playback rate can be adjusted back to be the same as that of other playback devices, so as to realize that the audio is played synchronously.

S103: when the estimated playback delay difference is greater than the first upper limit value or less than the first lower limit value, deleting audio data from or adding audio data to the audio buffer based on the estimated playback delay difference.

After the estimated playback delay difference of the current audio data is calculated, audio data can be deleted from or added to the audio buffer based on the estimated playback delay difference when the estimated playback delay difference is greater than the first upper limit value or less than the first lower limit value, thereby adjusting the amount of audio data in the audio buffer to match the set playback delay, such that the actual playback delay of the current audio data is closer to the set playback delay than the estimated playback delay. Accordingly, the purpose of playing the current audio data approximately with the set playback delay by the playback device can be accomplished.

In an embodiment, the operation of deleting audio data from or adding audio data to the audio buffer based on the estimated playback delay difference can be understood as the following cases. In a case where the estimated playback delay difference indicates that the difference value between the set playback delay of the current audio data and the estimated playback delay of the current audio data on the playback device is greater than the opposite number of the first lower limit value or the first upper limit value, the operation of adding audio data can be performed on the audio buffer. That is, the amount of audio data in the audio buffer increases so that the playback time corresponding to the amount of audio data in the audio buffer becomes longer. Accordingly, the actual playback delay of the current audio data is closer to the set playback delay than the estimated playback delay. In a case where the estimated playback delay difference indicates that the difference value between the set playback delay of the current audio data and the estimated playback delay of the current audio data on the playback device is less than the opposite number of the first upper limit value or the first lower limit value, the operation of deleting audio data can be performed on the audio buffer. That is, the amount of audio data in the audio buffer decreases so that the playback time corresponding to the audio volume in the audio buffer is shortened. Accordingly, the actual playback delay of the current audio data is closer to the set playback delay than the estimated playback delay.

The operation of adding audio data to the audio buffer may refer to writing preset audio data of first preset time into the audio buffer. In an embodiment, the preset audio data may be muted audio data. The first preset time can be set according to actual requirements, however, it is not limited here. For example, the first preset time may be a value that is calculated based on the estimated playback delay difference. For example, the first preset time may be positively correlated with the estimated playback delay difference. Specifically, the first preset time may be equal to the sum of the estimated playback delay difference and a third preset value. The third preset value can be set according to the opposite number of the first lower limit value or the first upper limit value. In an exemplary embodiment, the third preset value is equal to the opposite number of ½ of the first lower limit value, that is, the first preset time may be equal to the sum of the opposite number of ½ of the first lower limit and the estimated playback delay difference. Alternatively, the third preset value may be equal to ½ of the first upper limit value, that is, the first preset time may be equal to the sum of the estimated playback delay difference and ½ of the first upper limit value. In an embodiment, the third preset value can be set to a value matching the audio playback rate, so as to provide a buffering amount matching the time consumed for writing data, thereby increasing the convergence speed and realizing synchronous audio playback as soon as possible.

The operation of deleting the audio data from the audio buffer may refer to deleting the audio data of the second preset time in the audio buffer. In an embodiment, the position of the deleted audio data that is in the audio buffer is not limited. For example, it can be located at the tail or the head of the queue. The second preset time can be set according to the actual requirements, however, it is not limited here. For example, the second preset time may be a value that is calculated based on the estimated playback delay difference. For example, the second preset time may be positively correlated with the estimated playback delay difference. Specifically, the second preset time may be equal to the sum of the estimated playback delay difference and a fourth preset value. The fourth preset value can be set according to the opposite number of the first upper limit value or the first lower limit value. In an exemplary embodiment, the fourth preset value is equal to ½ of the opposite number of the first upper limit value, that is, the second preset time may be equal to the sum of ½ of the opposite number of the first upper limit value and the estimated playback delay difference. Alternatively, the fourth preset value may be equal to ½ of the first lower limit value, that is, the second preset time may be equal to the sum of the estimated playback delay difference and ½ of the first lower limit value. The fourth preset value can be set to a value that matches the audio playback rate, so as to provide a buffering amount that matches the time consumed for writing data, thereby increasing the convergence speed and realizing audio synchronous playback as soon as possible.

S104: adding the current audio data to the audio buffer, so as to perform a playback operation on the audio data that is in the audio buffer.

After it is confirmed that the estimated playback delay difference is between the first lower limit value and the first upper limit value or that the estimated playback delay difference is greater than the first upper limit value or less than the first lower limit value and audio data is deleted from or adding into the audio buffer based on the estimated playback delay difference, the current audio data can be added to the audio buffer so that the playback device can play the audio data approximately with the set playback delay when the playback device plays audio data in the arrangement order of the audio data that is in the audio buffer.

In the embodiment, after the playback device acquires the current audio data, the estimated playback delay difference of the current audio data can be calculated, so as to adjust the audio playback rate based on the estimated playback delay difference of the current audio data or delete audio data from or add audio data to the audio buffer. Accordingly, the actual playback delay of the current audio data is closer to the set playback delay than the estimated playback delay, thereby reducing the difference between the actual playback delay of the current audio data and the set playback delay of the current audio data and realizing the purpose that playing the current audio data approximately with the set playback delay by the playback device. Thus, when there are multiple playback devices playing the current audio data, the effect of synchronous playback of audio by multiple playback devices can be improved. When the estimated playback delay difference is between the first lower limit value and the first upper limit value, the playback rate of audio on the playback device is adjusted based on the estimated playback delay difference. When the estimated playback delay difference is greater than the first upper limit value or less than the first lower limit value, audio data is deleted from or added to the audio buffer based on the estimated playback delay difference. Accordingly, the playback device can play the current audio data approximately with the set playback delay through adjusting the playback rate when the absolute value of the estimated playback delay difference is relatively small, but there is no need to add audio data to or delete audio data from the audio buffer, such that synchronous audio playback can be achieved while the audio playback effect is ensured. When the absolute value of the estimated playback delay difference is relatively large, the purpose of playing the audio data approximately with the set playback delay by the playback device can be achieved as soon as possible through adding audio data to or deleting audio data from the audio buffer. That is, the audio synchronous playback can be realized as soon as possible, thereby reducing the time when multiple playback devices play audio asynchronously. Accordingly, the efficiency of audio synchronous playback is improved by providing different adjustment scales for different levels of the estimated playback delay difference.

Figure 3:
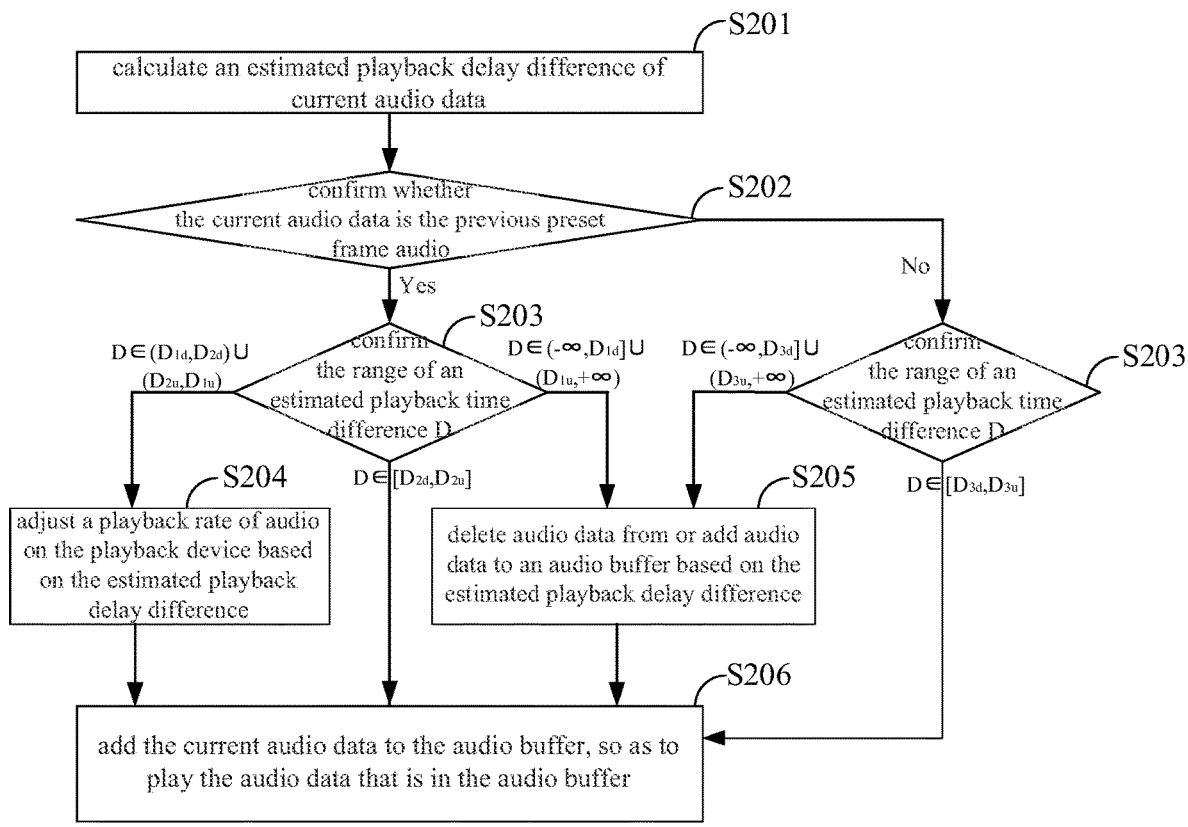
FIG. 3 is a flow chart of an audio playback method according to another embodiment of the present application.

As shown in FIG. 3, the audio playback method of the embodiment comprises the following steps. The audio playback method can be applied to a playback device. In an embodiment, the playback device may be a tablet computer, a smart home device, a mobile terminal, a Bluetooth audio system, a Bluetooth headset, etc., however, the present application is not limited thereto. It should be noted that the numbers of the following steps are for simplified description only, which is not intended to limit the execution order of the steps. The order in which the steps are performed in the embodiment can be changed arbitrarily without violating the technical idea of the present application.

S201: calculating an estimated playback delay difference of current audio data.

S202: confirming whether the current audio data is the previous preset frame audio.

After the estimated playback delay difference of the current audio data is calculated, which one of Step S204, S205, and 206 the method performs can be determined based on the determination result of whether the current audio data is the previous preset frame audio and the range of the estimated playback delay difference of the current audio data, so as to improve the efficiency of synchronous audio playback by providing different adjustment scales for different levels of the estimated playback delay difference.

In an embodiment, confirming whether the current audio data is the previous preset frame audio may indicate determining whether the current audio data is the previous preset frame audio acquired by the playback device this time. In an embodiment, the number of preset frames can be set according to actual requirements, and is not limited here, for example, it can be 20 or 30.

Optionally, the range interval of step S203 can be determined by confirming whether the current audio data is the previous preset frame audio, so as to determine which one of Step S204, S205, and 206 the method performs according to the determination result of whether the current audio data is the previous preset frame audio and the range of the estimated playback delay difference of the current audio data. As shown in FIG. 3, the method of the embodiment is additionally designed to adjust the playback rate for the previous preset frame audio, thereby avoiding the loss of the previous preset frame audio as much as possible under the premise of achieving synchronous audio playback for improving the effect of audio playback.

S203: confirming the range of an estimated playback time difference D.

The range interval of Step S203 can be confirmed based on the determination result of whether the current audio data is the previous preset frame audio, so as to determine which one of Step S204, S205, and 206 the method performs.

Optionally, if the current audio data is the previous preset frame audio, the range interval of the estimated playback time difference may comprise intervals: $(-\infty,$ first lower limit value $D_{1d}]$, (first lower limit value $D_{1d}$, second lower limit value $D_{2d}$), [second lower limit value $D_{2d}$, second upper limit value $D_{2u}$], (second upper limit value $D_{2u}$, first upper limit value $D_{1u}$), and [first upper limit value $D_{1u}$, $\infty$).

In an embodiment, if the estimated playback time difference D of the current audio data belongs to $(-\infty,$ first lower limit value $D_{1d}] \cup$ [first upper limit value $D_{1u}$, $\infty$), the method performs Step S205 to add audio data to or delete audio data from the audio buffer based on the estimated playback delay difference. If the estimated playback time difference D of the current audio data belongs to (first lower limit value $D_{1d}$, second lower limit value $D_{2d}) \cup$ (second upper limit value $D_{2u}$, first upper limit value $D_{1u}$), the method performs Step S204 to adjust the playback rate of audio on the playback device based on the estimated playback time difference. If the estimated playback time difference D of the current audio data belongs to [second lower limit value $D_{2d}$, second upper limit value $D_{2u}$], the method performs Step S206. That is, when the estimated playback time difference D of the current audio data is within an acceptable range, the audio playback rate and the data of the audio buffer are not processed, and the current audio data is directly added to the audio buffer, so as to perform the playback operation on the audio data that is in the audio buffer.

Further, the estimated playback delay difference may be equal to the difference value between the set playback delay of the current audio data and the estimated playback delay of the current audio data on the playback device. If the estimated playback time difference D of the current audio data belongs to $(-\infty,$ first lower limit value $D_{1d}]$, the method performs Step S205 to delete the audio data from the audio buffer based on the estimated playback delay difference. If the estimated playback time difference D of the current audio data belongs to [first upper limit value $D_{1u}$, c), the method performs Step S205 to add audio data to the audio buffer based on the estimated playback delay difference. If the estimated playback time difference D of the current audio data belongs to (first lower limit value $D_{1d}$, second lower limit value $D_{2d}$), the method performs Step S204 to increase the audio playback rate on the playback device based on the estimated playback delay difference. If the estimated playback time difference D of the current audio data belongs to (second upper limit value $D_{2u}$, first upper limit value $D_{1u}$), the method performs Step S204 to decrease the audio playback rate on the playback device based on the estimated playback delay difference. If the estimated playback time difference D of the current audio data belongs to [second lower limit value $D_{2d}$, second upper limit value $D_{2u}$], the method performs Step S206. That is, when the estimated playback time difference D of the current audio data is within an acceptable range, the audio playback rate and the data of the audio buffer are not processed, and the current audio data is directly added to the audio buffer, so as to perform the playback operation on the audio data that is in the audio buffer.

Optionally, if the current audio data does not belong to the previous preset frame audio, the range interval of the estimated playback time difference may comprises intervals: $(-\infty,$ third lower limit value $D_{3d}$), (third lower limit value $D_{3d}$, third upper limit value $D_{3u}$), and (third upper limit value $D_{3u}$, $\infty$) these intervals.

In an embodiment, if the estimated playback time difference D of the current audio data belongs to $(-\infty,$ third lower limit value $D_{3d}) \cup$ (third upper limit value $D_{3u}$, $\infty$), the method performs Step S205 to delete audio data from or add audio data to the audio buffer based on the estimated playback delay difference. If the estimated playback time difference D of the current audio data belongs to (third lower limit value $D_{3d}$, third upper limit value $D_{3u}$), the method performs Step S206. That is, when the estimated playback time difference of the current audio data is within an acceptable range, the audio playback rate and the data of the audio buffer are not further processed, and the current audio data is directly added to the audio buffer, so as to perform the playback operation on the audio data that is in the audio buffer.

Further, the estimated playback delay difference may be equal to the difference value between the set playback delay of the current audio data and the estimated playback delay of the current audio data on the playback device. If the estimated playback time difference D of the current audio data belongs to $(-\infty,$ third lower limit value $D_3$], the method performs Step S205 to delete the audio data from the audio buffer based on the estimated playback delay difference. If the estimated playback time difference D of the current audio data belongs to [third upper limit $D_{3u}$, $\infty$), the method performs Step S205 to add audio data to the audio buffer based on the estimated playback delay difference. If the estimated playback time difference D of the current audio data belongs to (third lower limit value $D_{3d}$, third upper limit value $D_{3u}$), the method performs Step S206. That is, when the estimated playback time difference D of the current audio data is within an acceptable range, the audio playback rate and the data of the audio buffer are not further processed, and the current audio data is directly added to the audio buffer, so as to perform the playback operation on the audio data that is in the audio buffer.

The playback duration corresponding to the amount of deleted audio data mentioned above may be equal to the estimated playback delay difference, or may be equal to the estimated playback delay difference+A*the third lower limit value. In an embodiment, A is not limited, for example, it can be ½. In addition, the playback duration corresponding to the amount of added audio data mentioned above may be equal to the estimated playback delay difference, or may be equal to the estimated playback delay difference+B*the third upper limit value. In an embodiment, B is not limited, for example, it can be ½.

In an embodiment, the third upper limit value and the third lower limit value can be set according to actual requirements and are not limited here. In an embodiment, the third upper limit value may be equal to the first upper limit value or the second upper limit value. Of course, the third upper limit value may not be equal to the first upper limit value and the second upper limit value. For example, the third upper limit value is between the first upper limit value and the second upper limit value. In an embodiment, the third lower limit value may be equal to the first lower limit value or the second lower limit value. Of course, the third lower limit value may not be equal to the first lower limit value and the second lower limit value. For example, the third lower limit value is between the first lower limit value and the second lower limit value.

In addition, in the case of the estimated playback time difference D of the current audio data=the third upper limit $D_{3u}$/the third lower limit $D_{3d}$, the method performs Step S205 or Step S206, which is not limited here.

S204: adjusting the playback rate of audio on the playback device based on the estimated playback delay difference.

When the current audio data is the previous preset frame audio and the estimated play time difference D of the current audio data belongs to (first lower limit value $D_{1d}$, second lower limit value $D_{2d}$)∪(second upper limit value $D_{2u}$, first upper limit value $D_{1u}$), the playback rate of audio on the playback device can be adjusted based on the estimated playback delay difference.

After the playback rate of audio on the playback device is adjusted, the method performs Step S206 to add the current audio data to the audio buffer. Accordingly, when the playback device plays audio data in the order of the audio data that is in the audio buffer, the playback device can play the current audio data approximately with the set playback delay.

S205: deleting audio data from or add audio data to the audio buffer based on the estimated playback delay difference.

When the current audio data is the previous preset frame audio and the estimated playback time difference D of the current audio data belongs to (−∞, first lower limit value $D_{1d}$]∪[first upper limit value $D_{1u}$, ∞), or when the current audio data does not belong to the previous preset frame audio and the estimated playback time difference D of the current audio data belongs to (−∞, third lower limit value $D_{3d}$]∪(third upper limit value $D_{3u}$, ∞), audio data is deleted from or added to the audio buffer based on the estimated playback delay difference.

After audio data is deleted from or added to the audio buffer, the method performs Step S206 to add the current audio data to the audio buffer. Accordingly, when the playback device plays audio data in the order of the audio data that is in the audio buffer, the playback device can play the current audio data approximately with the set playback delay.

S206: adding the current audio data to the audio buffer, so as to play the audio data that is in the audio buffer.

In addition, in order to further improve the playback effect, during the playback, the preset audio data can be transmitted to the audio buffer first before the playback audio is acquired so that the audio playback system can be activated in advance through the preset audio data and the audio playback system can be adjusted with the preset audio data in advance. Then, the audio delay is already within an appropriate range when the audio playback starts. In this way, the audio synchronization can be achieved quickly during the official playback, which avoids the need to activate the audio playback system when the playback audio starts, resulting in long audio playback delay and poor audio synchronization playback effect and even causing playback audio to be discarded.

Moreover, before the playback audio is acquired, the audio playback method in the above-mentioned embodiment may also applied to adjust the amount of preset audio data that is in the audio buffer and/or the audio playback rate so that the estimated playback delay difference of the audio is already within a small range when the playback audio starts, so as to match the playback delay of the audio playback with the set playback delay as much as possible.

Optionally, when the playback audio is acquired, adding a new preset audio data to the audio buffer is forbidden, and whether it is necessary to adjust the amount of preset audio data that is in the audio buffer and/or the audio playback rate is determined through the audio playback method of the above-mentioned embodiment. When the adjustment is needed, the amount of audio data that is in the audio buffer and/or the audio playback rate us adjusted, and then the playback audio is added to the audio buffer. When no adjustment is needed, the playback audio is directly added to the audio buffer so that the playback device can play the playback audio through reading the data in the audio buffer.

In an embodiment, the above-mentioned preset audio data may refer to mute data, that is, zero data. In this way, by activating the audio playback system in advance through the mute data, the audio playback system can be activated in advance without the user's awareness, which improves user experience.

In addition, it has been found that through experiments, playback delay difference of audio data can be adjusted to an appropriate range (for example, +/−100 us) using the playback method of the above embodiment. Moreover, the delay of starting the playback on the playback device can be relatively small, For example, the delay of starting the playback on the playback device can be about 50 ms.

Figure 4:
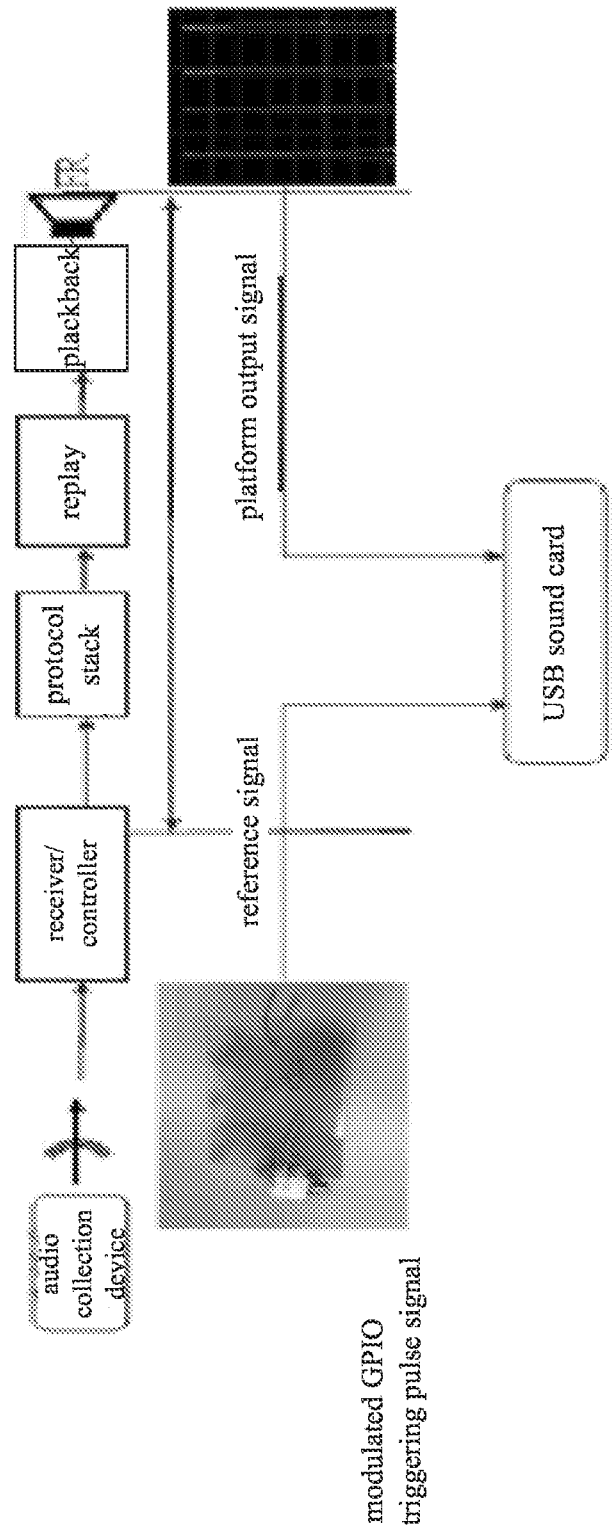
FIG. 4 is a schematic diagram showing calculation of an actual playback delay of audio data of the present application.

In an embodiment, the calculation operation of the actual playback delay of the audio data of the playback device (i.e., the presentation delay shown in the figure) can be as shown in FIG. 4, however, it is not limited thereto. As shown in FIG. 4, a pulse signal can be triggered by pulling up the GPIO to obtain a reference signal and the platform output signal of the playback device. By comparing the reference signal and the platform output signal, the reference signal matching the platform output signal is found, and the actual playback delay of the audio data of the playback device is calculated based on the time of the reference signal and the time of the platform output signal.

Figure 5:
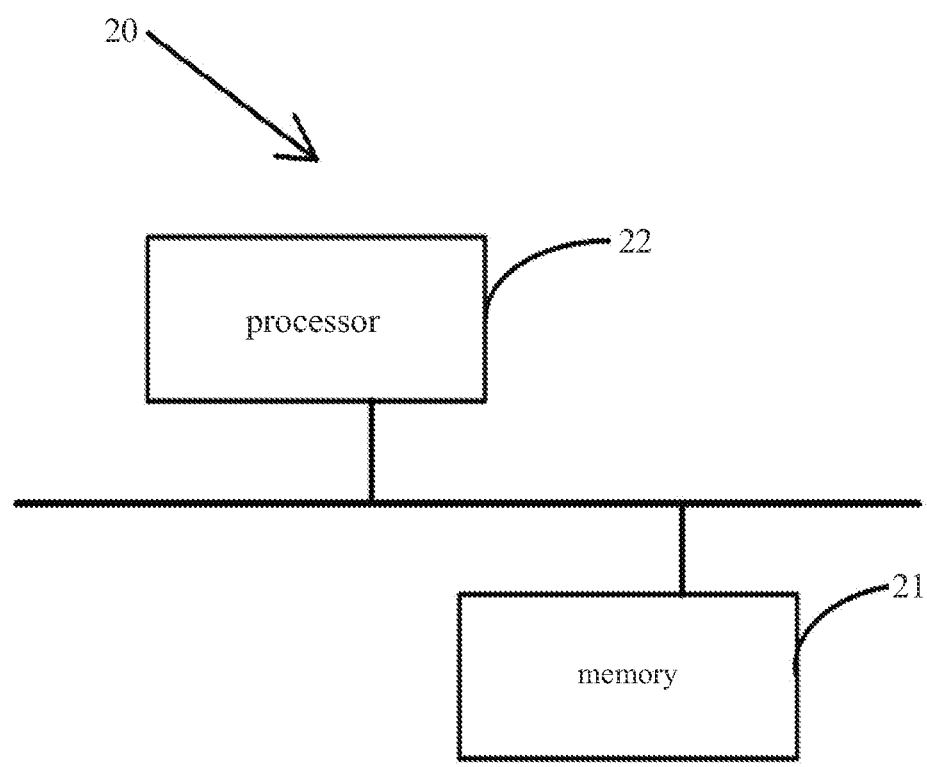
FIG. 5 is a schematic structural diagram showing an electronic device according to an embodiment of the present application.

Please refer to FIG. 5. FIG. 5 is a schematic structural diagram of an electronic device 20 according to an embodiment of the present application. The electronic device 20 of the present application comprises a processor 22. The processor 22 is configured to execute instructions to implement the method provided in any one of the above-mentioned embodiments of the present application and the methods provided in any non-conflicting combination.

The processor 22 may also be referred to as a central processing unit (CPU). The processor 22 may be an integrated circuit chip with signal processing capabilities. The processor 22 can also be a general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor 22 may be any conventional processor.

The electronic device 20 may further comprise a memory 21 for storing instructions and data required for the operation of the processor 22.

Figure 6:
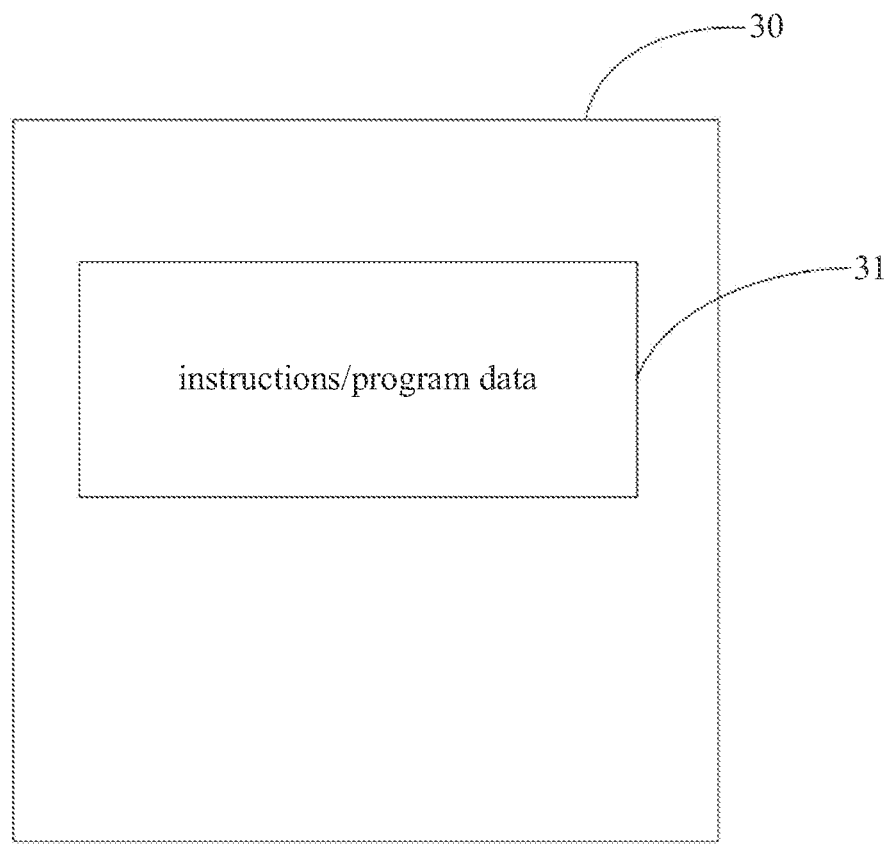
FIG. 6 is a schematic structural diagram showing a computer-readable storage medium according to an embodiment of the present application.

Please refer to FIG. 6, which is a schematic structural diagram of a computer-readable storage medium according to an embodiment of the present application. A computer-readable storage medium 30 of the embodiment of the present application stores instructions/program data 31. When the instructions/program data 31 are executed, the method provided in any one of the above-mentioned embodiments of the present application and the methods provided in any non-conflicting combination are implemented. In an embodiment, the instructions/program data 31 can form a program file and be stored in the above-mentioned storage medium 30 in the form of a software product so that a computer device (which can be a personal computer, a server, or a network device, etc.) or a processor performs all or part of the steps of the methods in the various embodiments of the present application. The aforementioned storage medium 30 may comprise a U disk, a mobile hard disk, a read-only memory (ROM), a random access memory (RAM), a magnetic disk, an optical disk, or another media that can store program codes. Or, the aforementioned storage medium 30 may be implemented by a device such as a computer, a server, a mobile phone, and a tablet.

In the several embodiments provided in the present application, it should be understood that the disclosed system, device, and method can be implemented in other ways. For example, the device embodiments described above are only illustrative. For example, the division of units is only a logical function division. In actual implementation, there may be other division manners. For example, multiple units or components can be combined or integrated into another system, or some features may be ignored or not be implemented. Moreover, the mutual coupling or direct coupling or communication connection shown or discussed may be achieved through some interfaces. The indirect coupling or communication connection of devices or units may be in an electrical, mechanical, or other-type manner.

In addition, the respective functional units in each embodiment of the present application may be integrated into one processing unit, each unit may exist separately and physically, or two or more units may be integrated into one unit. The above-mentioned integrated units can be implemented by hardware or software functional units.

It should also be noted that the term "comprises", "includes" or any other variation thereof is intended to cover a non-exclusive inclusion so that a process, method, product, or device comprising a set of elements comprises not only those elements, but also other elements not expressly listed or but also elements inherent in the process, method, product, or device. Without further limitations, an element specified by the phrase "comprising a . . . " does not exclude the presence of additional identical elements in the process, method, product, or device that comprises the element.

The above description is only for the embodiments of the present application and is not intended to limit the patent scope of the present application. Transforming any equivalent structure or equivalent process made by using the contents of the specification and drawings of the present application specification or directly or indirectly using the present application in other related technical fields are all included in the patent protection scope of the present application.

What is claimed is:

1. An audio playback method comprising:
    calculating an estimated playback delay difference of a current audio data, wherein the estimated playback delay difference is a difference value between a set playback delay of the current audio data and an estimated playback delay of the current audio data on a playback device or an opposite number of the difference value;
    in response to the estimated playback delay difference being between a first lower limit value and a first upper limit value, adjusting a playback rate of audio on the playback device based on the estimated playback delay difference;
    in response to the estimated playback delay difference being greater than the first upper limit value or less than the first lower limit value, deleting audio data from or adding audio data to an audio buffer of the playback device based on the estimated playback delay difference; and
    adding the current audio data to the audio buffer to play audio data that is in the audio buffer,
    wherein before the estimated playback delay difference of the current audio data is calculated, the audio playback method further comprises:
        transmitting preset audio data to the audio buffer to activate playback components in the playback device in advance; and
        in response to acquiring audio data to be played, stopping the transmission of the preset audio data to the audio buffer and taking the audio data to be played as the current audio data.

2. The audio playback method as claimed in claim 1, wherein after calculating the estimated playback delay difference of the current audio data, the audio playback method further comprises:
    confirming whether the current audio data is previous preset frame audio;
    in response to the current audio data being the previous preset frame audio, adjusting the playback rate of audio on the playback device based on the estimated playback delay difference in response to the estimated playback delay difference being between a first lower limit value and a first upper limit value, or deleting audio data from or adding audio data to the audio buffer of the playback device based on the estimated playback delay difference in response to the estimated playback delay difference being greater than the first upper limit value or less than the first lower limit value; and
    in response to the current audio data not belonging to the previous preset frame audio, deleting audio data from or adding audio data to the audio buffer of the playback device based on the estimated playback delay difference in response to the estimated playback delay difference being greater than a third upper limit value or less than a third lower limit value.

3. The audio playback method as claimed in claim 1, wherein adjusting the playback rate of audio on the playback device based on the estimated playback delay difference in response to the estimated playback delay difference being between the first lower limit value and the first upper limit value comprises:
    in response to the estimated playback delay difference being between the first lower limit value and a second lower limit value or between a second upper limit value and the first upper limit value, adjusting the playback rate of audio on the playback device based on the estimated playback delay difference; and
    in response to the estimated playback delay difference being between the second lower limit value and the second upper limit value, performing no processing on the playback rate.

4. The audio playback method as claimed in claim 1, wherein adjusting the playback rate of audio on the playback device based on the estimated playback delay difference comprises:

adjusting the playback rate of audio on the playback device by adjusting a clock frequency of the playback device.

5. The audio playback method as claimed in claim 1, wherein the estimated playback delay difference is equal to the difference value, and deleting audio data from or adding audio data to the audio buffer of the playback device based on the estimated playback delay difference in response to the estimated playback delay difference being greater than the first upper limit value or less than the first lower limit value comprises:

in response to the estimated playback delay difference being greater than the first upper limit value, adding audio data to the audio buffer of the playback device based on the estimated playback delay difference; and in response the estimated playback delay difference being less than the first lower limit value, deleting audio data from the audio buffer of the playback device based on the estimated playback delay difference.

6. The audio playback method as claimed in claim 5 further comprising:

in response to the estimated playback delay difference being greater than the first upper limit, causing a playback duration corresponding to the amount of added audio data to be equal to a sum of the estimated playback delay difference and ½ of the first upper limit value; and in response to the estimated playback delay difference being less than the first lower limit value, causing a playback duration corresponding to the amount of deleted audio data to be equal to a sum of the estimated playback delay difference and ½ of the first lower limit value.

7. The audio playback method as claimed in claim 1, wherein calculating the estimated playback delay difference of the current audio data comprises:

taking a value that is obtained by subtracting a playback duration corresponding to the amount of audio data in the audio buffer and a current time from the set playback delay of the current audio data as the estimated playback delay difference.

8. An electronic device, wherein the electronic device comprises a processor, and the processor executes instructions to perform the audio playback method as claimed in claim 1.

9. The electronic device as claimed in claim 8, wherein after calculating the estimated playback delay difference of the current audio data, the processor further performs:

confirming whether the current audio data is previous preset frame audio;

in response to the current audio data being the previous preset frame audio, adjusting the playback rate of audio on the playback device based on the estimated playback delay difference in response to the estimated playback delay difference being between a first lower limit value and a first upper limit value, or deleting audio data from or adding audio data to the audio buffer of the playback device based on the estimated playback delay difference in response to the estimated playback delay difference being greater than the first upper limit value or less than the first lower limit value; and in response to the current audio data not belonging to the previous preset frame audio, deleting audio data from or adding audio data to the audio buffer of the playback device based on the estimated playback delay difference in response to the estimated playback delay difference being greater than a third upper limit value or less than a third lower limit value.

10. The electronic device as claimed in claim 8, wherein the processor adjusting the playback rate of audio on the playback device based on the estimated playback delay difference in response to the estimated playback delay difference being between the first lower limit value and the first upper limit value comprises:

in response to the estimated playback delay difference being between the first lower limit value and a second lower limit value or between a second upper limit value and the first upper limit value, adjusting the playback rate of audio on the playback device based on the estimated playback delay difference; and in response to the estimated playback delay difference being between the second lower limit value and the second upper limit value, performing no processing on the playback rate.

11. The electronic device as claimed in claim 8, wherein the processor adjusting the playback rate of audio on the playback device based on the estimated playback delay difference comprises:

adjusting the playback rate of audio on the playback device by adjusting a clock frequency of the playback device.

12. The electronic device as claimed in claim 8, wherein the estimated playback delay difference is equal to the difference value, and the processor deleting audio data from or adding audio data to the audio buffer of the playback device based on the estimated playback delay difference in response to the estimated playback delay difference being greater than the first upper limit value or less than the first lower limit value comprises:

in response to the estimated playback delay difference being greater than the first upper limit value, adding audio data to the audio buffer of the playback device based on the estimated playback delay difference; and in response the estimated playback delay difference being less than the first lower limit value, deleting audio data from the audio buffer of the playback device based on the estimated playback delay difference.

13. The electronic device as claimed in claim 12, the processor further performs:

in response to the estimated playback delay difference being greater than the first upper limit, causing a playback duration corresponding to the amount of added audio data to be equal to a sum of the estimated playback delay difference and ½ of the first upper limit value; and in response to the estimated playback delay difference being less than the first lower limit value, causing a playback duration corresponding to the amount of deleted audio data to be equal to a sum of the estimated playback delay difference and ½ of the first lower limit value.

14. The electronic device as claimed in claim 8, wherein before the estimated playback delay difference of the current audio data is calculated, the processor further performs:

transmitting preset audio data to the audio buffer to activate playback components in the playback device in advance; and in response to acquiring audio data to be played, stopping the transmission of the preset audio data to the audio buffer and taking the audio data to be played as the current audio data.

15. The electronic device as claimed in claim 8, wherein the processor calculating the estimated playback delay difference of the current audio data comprises:

taking a value that is obtained by subtracting a playback duration corresponding to the amount of audio data in the audio buffer and a current time from the set playback delay of the current audio data as the estimated playback delay difference.

16. A non-transitory computer-readable storage medium, wherein the computer-readable storage medium stores instructions/program data, and the instruction/program data are executed to perform the audio playback method as claimed in claim 1.

\* \* \* \* \*